United States Patent
Oiwa et al.

(10) Patent No.: US 9,377,650 B2
(45) Date of Patent: Jun. 28, 2016

(54) LIQUID CRYSTAL DISPLAY DEVICE

(71) Applicant: Japan Display Inc., Tokyo (JP)

(72) Inventors: Mika Oiwa, Tokyo (JP); Shinichiro Oka, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/598,273

(22) Filed: Jan. 16, 2015

(65) Prior Publication Data

US 2015/0198841 A1 Jul. 16, 2015

(30) Foreign Application Priority Data

Jan. 16, 2014 (JP) .................... 2014-005555

(51) Int. Cl.
*G02F 1/1335* (2006.01)

(52) U.S. Cl.
CPC .... *G02F 1/133504* (2013.01); *G02F 1/133611* (2013.01); *G02F 2001/133562* (2013.01); *G02F 2001/133622* (2013.01)

(58) Field of Classification Search
CPC ............. G02F 1/133504; G02F 1/133611; G02F 2001/133622; G02F 2001/133562; G02F 1/133621; G02F 1/1368; G09G 3/2007; G09G 3/3413; G09G 2320/0271; G09G 2320/0242
USPC .................................... 349/61, 65
See application file for complete search history.

(56) References Cited

U.S. PATENT DOCUMENTS

| 2007/0222743 A1* | 9/2007 | Hirakata | G09G 3/3413 345/102 |
| 2015/0339968 A1* | 11/2015 | Yoshioka | G02F 1/1368 345/690 |

FOREIGN PATENT DOCUMENTS

JP  2000-214456 A  8/2000

* cited by examiner

*Primary Examiner* — Anne Hines
*Assistant Examiner* — Jose M Diaz
(74) *Attorney, Agent, or Firm* — Ulmer & Berne LLP (57) ABSTRACT

To achieve a liquid crystal display device of a field sequential system with sufficient response speed and uniformity of viewing angle, the liquid crystal display device includes polarizing plates attached on front and back surfaces of a liquid crystal display panel, a backlight provided on the back surface of the liquid crystal display panel, and an anisotropic diffusion film provided on the front side of the liquid crystal display panel. The liquid crystal display panel and the backlight are driven by the field sequential system. The distribution of the contrast of the liquid crystal display panel varies depending on the azimuth direction. Then, the azimuth direction in which the contrast of the liquid crystal display panel is small is equal to the azimuth direction in which the emission intensity when parallel light is incident on the anisotropic diffusion film is strong, to achieve uniform contrast in all azimuth directions.

3 Claims, 8 Drawing Sheets

RED, GREEN, BLUE, WHITE — DISPLAY STATE

FIG. 10B

WHITE, BLACK, WHITE, BLACK — DISPLAY PANEL

BACKLIGHT (RED) — SUBFIELD (1)
BACKLIGHT (GREEN) — SUBFIELD (2)
BACKLIGHT (BLUE) — SUBFIELD (3)

FIELD 1

LIQUID CRYSTAL DISPLAY DEVICE

CLAIM OF PRIORITY

The present application claims priority from Japanese Patent Application JP 2014-005555 filed on Jan. 16, 2014, the content of which is hereby incorporated by reference into this application.

BACKGROUND

The present invention relates to a display device with a backlight, and more particularly to a liquid crystal display device using a field sequential system.

A display device includes a TFT substrate in which pixels each having a pixel electrode, a thin film transistor (TFT), and the like are arranged in a matrix form. Further, there is provided a counter substrate opposite the TFT substrate, in which color filters and the like are formed at positions corresponding to the pixel electrodes of the TFT substrate. Further, a liquid crystal is interposed between the TFT substrate and the counter substrate. Then, an image is formed by controlling the transmittance of light through each pixel by the liquid crystal molecules.

The liquid crystal display device can be made thin and lightweight, and is thus widely used in a variety of fields. The liquid crystal does not emit any light of its own, so that a backlight is provided on the back side of a liquid crystal display panel. There is a technique for increasing the amount of light in the perpendicular direction to the surface of the liquid crystal display panel by using a prism sheet, and the like, in order to increase the efficiency of the use of the backlight.

The viewing angle characteristics are a problem for the liquid crystal display device. Japanese Unexamined Patent Application Publication No. 2000-214456 describes a structure that can achieve high viewing angle characteristics and high contrast by means of a collimated backlight with collimating means for the back light.

SUMMARY

In a liquid crystal display device using a color filter, the light is absorbed by the color filter, so that the efficiency of the use of the backlight is not good. As the driving method of the liquid crystal display device, there is a driving method by a so-called field sequential system. The field sequential system can operate without using the color filter, so that the energy efficiency of the backlight is excellent.

Figure 10A:
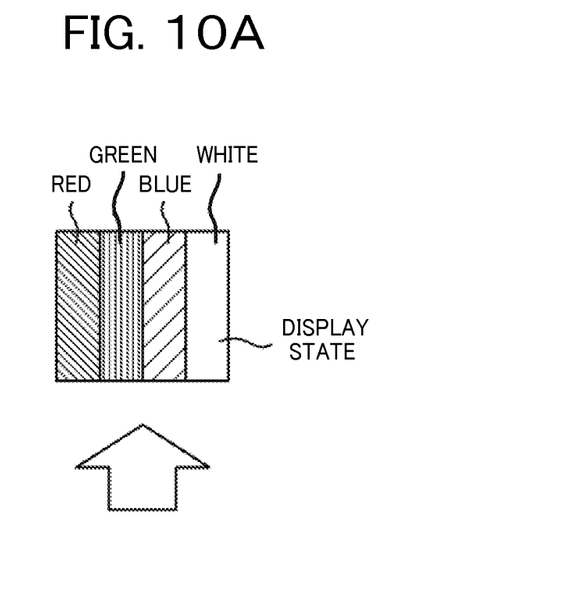
FIGS. 10A and 10B are schematic views showing the operation of the field sequential system.
Figure 10B:
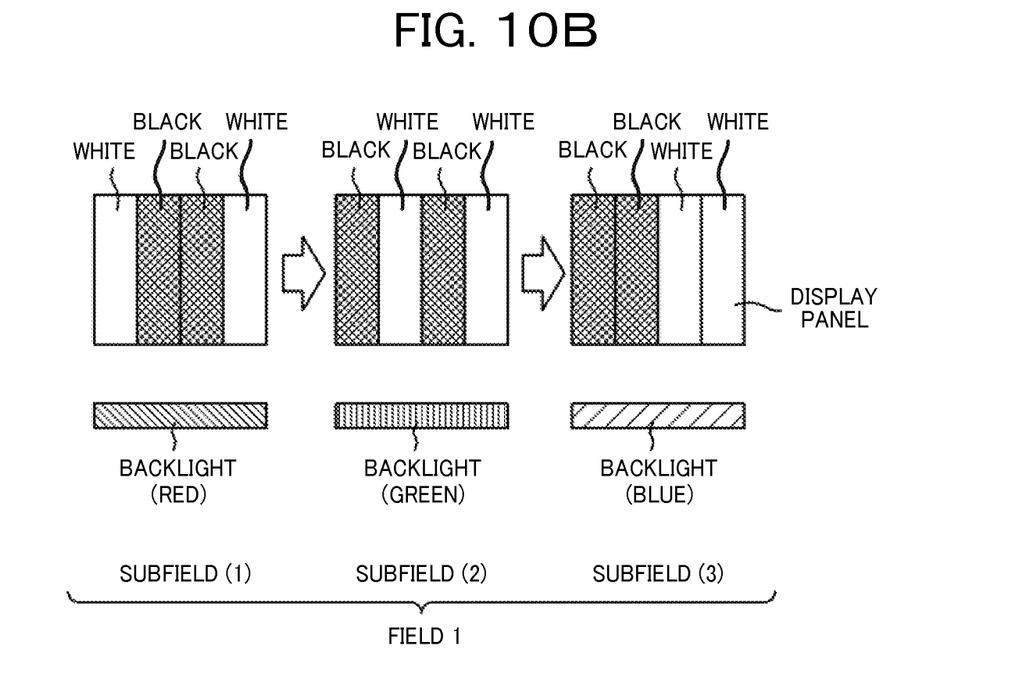

FIGS. 10A and 10B are schematic views showing the principle of the field sequential system. FIG. 10A shows a pattern displayed in the display area of the liquid crystal display panel, showing a display state of a strip-shaped pattern of red, green, blue, and white. FIG. 10B shows the state in which one field is divided into three subfields in which the backlight is turned on to emit red, green, and blue lights in order to obtain the display shown in FIG. 10A. In other words, the display pattern is changed by changing the signal voltage applied to the liquid crystal cell according to the lighting period of each color, to allow the pattern of FIG. 10A to be viewed after the three subfields are displayed.

In FIGS. 10A and 10B, only the red of the three back lights is turned on in the subfield (1). At this time, the light passes through only the red pixel (R) and the pixel corresponding to white. In the subfield (2), only the green of the three back lights is turned on. At this time, the light passes through only the green pixel (G) and the pixel corresponding to white. In the subfield (3), only the blue of the three back lights is turned on. At this time, the light passes through only the blue pixel (B) and the pixel corresponding to white.

As described above, for example, when only the red is displayed, there is no need to turn on the green and blue light sources, so that the energy efficiency is excellent. FIGS. 10A and 10B show an example of the most common three RGB subfields. However, the present invention is not limited to this example, and can also be applied to the field sequential system for complementary colors to emit light of colors that are complementary to one another.

The most important problem in the implementation of the field sequential system is that the response speed of the liquid crystal is slow. In general, the response of the liquid crystal can be expressed by equation (1) and equation (2).

Equation 1

$$\tau_{\mathit{off}} = \frac{\gamma_1 d^2}{\pi^2 K} \tag{1}$$

Equation 2

$$\tau_{on} = \frac{\gamma_1}{\varepsilon_0 |\Delta \varepsilon| E^2 - \frac{\pi^2}{d^2} K} \tag{2}$$

It is given that τoff in equation (1) is the response time when the voltage is turned off, while τon is the response time when voltage is turned on. Further, τ1 is the rotary viscosity coefficient of the liquid crystal material, d is the gap of the liquid crystal layer, K is the elastic constant of the liquid crystal material, and $\Delta\in$ is the dielectric anisotropy.

As can be seen from equation (1) and equation (2), the response time of the liquid crystal is proportional to the square of the gap and to the elastic constant. The elastic constant depends on the display mode of the liquid crystal. Although some liquid crystal display modes have a short response time, there are also modes with an insufficient viewing angle. Further, the contrast may be reduced with a structure in which the viewing angle is increased.

An object of the present invention is to achieve a liquid crystal display device with sufficient response time for field sequential operation, and with a sufficient viewing angle or screen contrast.

The present invention is made to solve the problems described above. The main aspects are as follows.

(1) There is provided a liquid crystal display device with a backlight provided on a back side of a liquid crystal display panel which is formed in such a way that a liquid crystal layer is interposed between a first substrate and a second substrate, a first polarizing plate is attached to the outside of the first substrate, and a second polarizing plate is attached to the outside of the second substrate. The liquid crystal display panel and the backlight are driven by a field sequential system. An anisotropic diffusion film is attached onto the first polarizing plate which is located on the display surface side of the liquid crystal display panel. The distribution of the contrast of the liquid crystal display panel varies depending on the azimuth direction. The emission intensity of parallel light incident on the anisotropic diffusion film varies depending on the azimuth direction. The azimuth direction in which the contrast of the liquid crystal display panel is small is equal to the azimuth direction in which the emission intensity when parallel light is incident on the anisotropic diffusion film is strong.

(2) In the liquid crystal display device described in (1), the liquid crystal display panel is a TN-type liquid crystal display panel.

(3) In the liquid crystal display device described in (2), the azimuth direction in which the emission intensity of the anisotropic diffusion film is strong varies in the positive azimuth direction and in the negative azimuth direction.

According to the present invention, it is possible to achieve a crystal display device of a field sequential system with sufficient response speed for field sequential operation and with useful viewing angle characteristics and contrast characteristics.

DETAILED DESCRIPTION

Hereinafter, the present invention will be described in detail with reference to a specific embodiment.

First Embodiment

Figure 1:
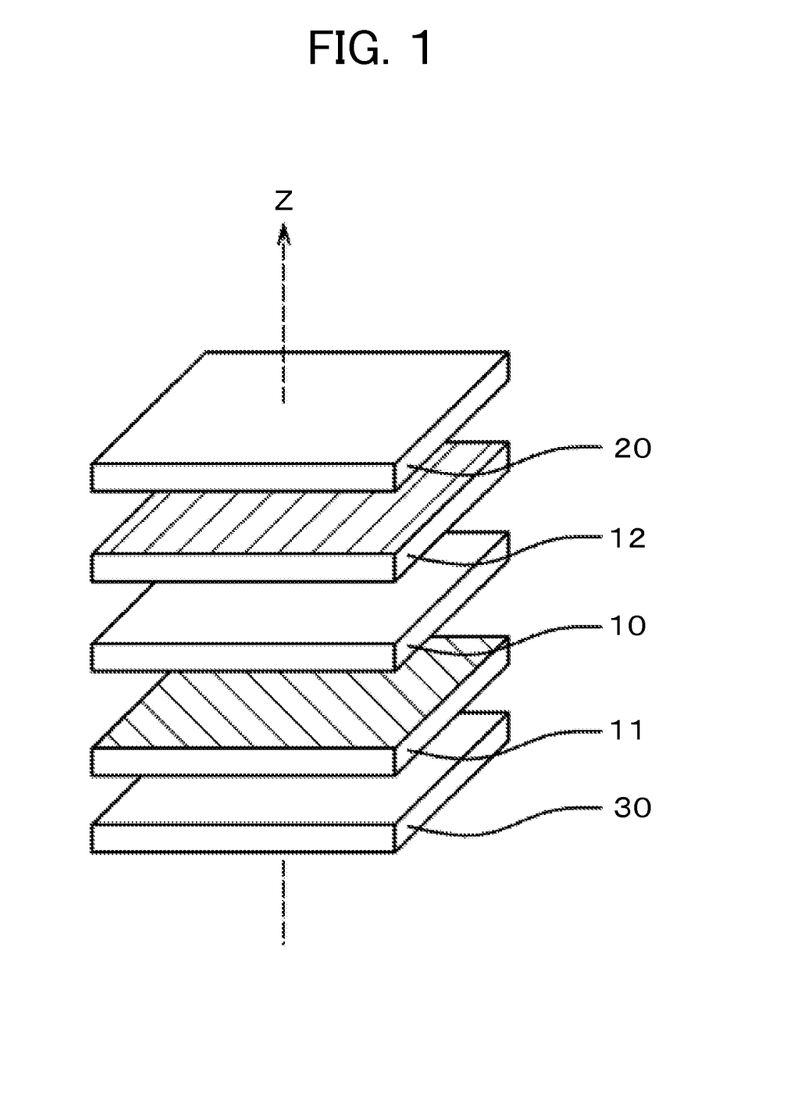
FIG. 1 is an exploded perspective view of a liquid crystal display device according to the present invention.

FIG. 1 is an exploded perspective view of a liquid crystal display device according to the present invention. The liquid crystal display device shown in FIG. 1 is operated by a field sequential system. In FIG. 1, a twisted nematic (TN) type liquid crystal display panel is used for a liquid crystal display panel 10. There is a problem in the viewing angle characteristics for the TN type. However, the response speed can be increased by reducing the distance between the TFT substrate and the counter substrate, namely, by reducing the layer thickness of the liquid crystal layer. Thus, the TN type is suitable for the field sequential system.

In FIG. 1, a lower polarizing plate 11 is provided on the back surface of the liquid crystal display panel 10. Then, an upper polarizing plate 12 is provided on the upper surface of the liquid crystal display panel. A backlight 30 is provided below the lower polarizing plate 11. Then, an anisotropic diffusion film 20 is provided above the upper polarizing plate 11. As shown in FIG. 1, the feature of the present invention is to provide the anisotropic diffusion film 20 in advance of the liquid crystal display panel 10.

Figure 2:
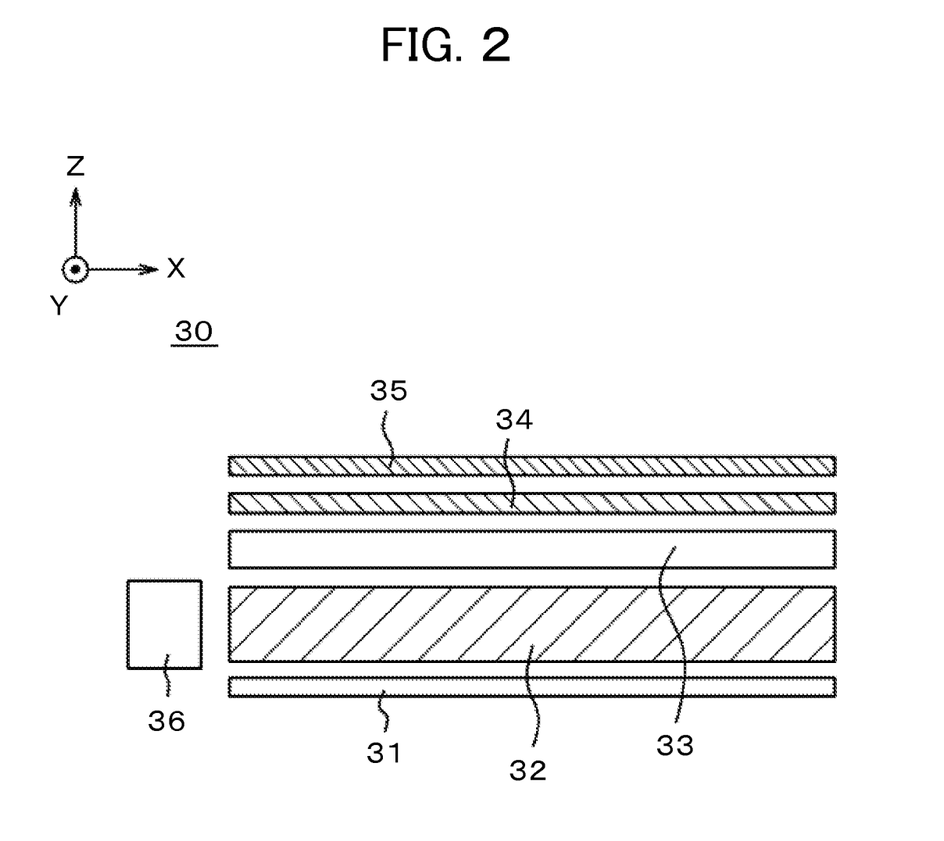
FIG. 2 is a cross-sectional view of a backlight.

FIG. 2 is a cross-sectional view showing an example of the backlight 30 of FIG. 1. In FIG. 2, an LED 36, which is a light source, is provided on a side of a light guide plate 32. The LED 36 emitting red, green, and blue light is provided on the side of the liquid guide plate 32. A reflective sheet 31 is provided below the light guide plate 32 to reflect the light in the direction of the liquid crystal display panel.

A diffusion sheet 33 is provided on the light guide plate 32. Then, a lower prism sheet 34 and an upper prism sheet 35 are provided on the diffusion sheet 33. The lower prism sheet 34 has a role to focus, for example, the light to be spread in the x direction into the z direction. The upper prism sheet 35 has a role to focus, for example, the light to be spread in the y direction into the z direction. The use of the prism sheets can increase the efficiency of the use of light.

Figure 3A:
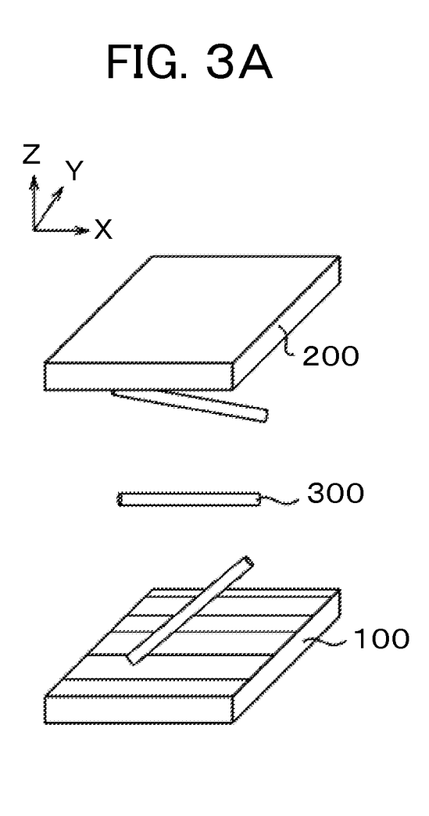
FIGS. 3A, 3B, and 3C are schematic views showing the operation of a TN-type liquid crystal display panel.
Figure 3B:
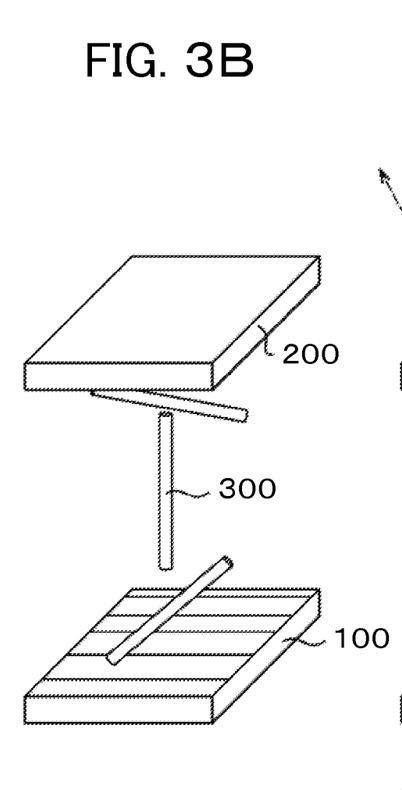
Figure 3C:
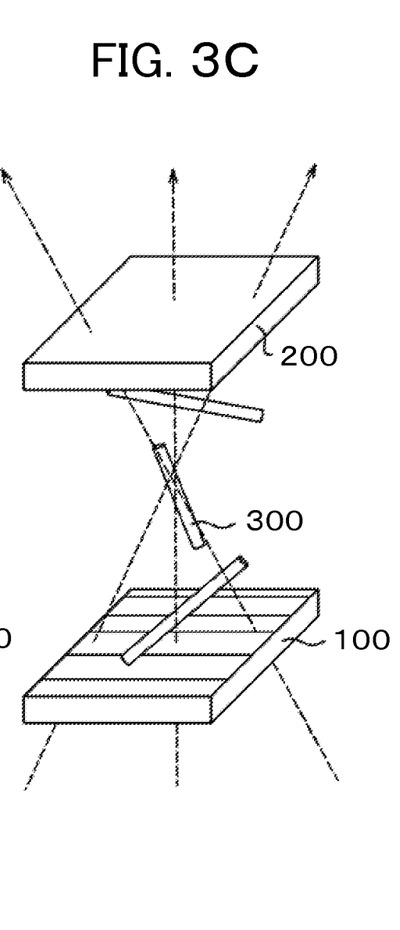

FIGS. 3A, 3B, and 3C show the operation of the TN-type liquid crystal display panel 10 used in the present invention. In FIGS. 3A, 3B, and 3C, a liquid crystal layer is provided between a TFT substrate 100 in which pixels each having a pixel electrode and a TFT are formed in a matrix pattern and a counter substrate 200 in which a common electrode is formed. Then, an alignment film is formed in the TFT substrate 100 and the counter substrate 200 at portions contacting the liquid crystal, respectively, for initial alignment of the liquid crystal molecules.

For example, the alignment film of the TFT substrate 100 is subject to an alignment process by rubbing or other means in order to align a liquid crystal molecule 300 in the y axis direction. The alignment film of the counter substrate 200 is subject to an alignment process by rubbing or other means in order to align the liquid crystal molecule 300 in the x axis direction. Thus, the liquid crystal molecule 300 is twisted by 90 degree between the TFT substrate 100 and the counter substrate 200.

The light passing through the lower polarizing plate 11 is converted into a linearly polarized light. The polarization direction of the particular light is rotated by 90 degree due to the optical activity of the liquid crystal layer. Then, the light passes through the counter substrate 200 and through the transmission axis of the upper polarizing plate 12. FIG. 3A shows this state, in which the light passing through the lower polarizing plate 11 is emitted from the upper polarizing plate 12. Thus, a white display is provided in this case.

When a sufficient voltage is applied to the pixel electrode of the TFT substrate 100, the liquid crystal molecule 300 rises up to the side of the counter substrate 200. In such a state, the optical activity of the liquid crystal layer is lost, and the polarization axis of the polarized light incident on the liquid crystal layer is not rotated, so that the light is blocked by the liquid crystal layer. This state is shown in FIG. 3B. The state shown in FIG. 3B is turned into a black display.

When a voltage of halftone is applied to the pixel electrode, some of the light incident on the liquid crystal layer can pass through, and a halftone is displayed. This state is shown in FIG. 3C. The TN-type liquid crystal display panel is designed to be able to increase the electric field by reducing the distance between the TFT substrate 100 and the counter substrate 200 in order to increase the response speed of the liquid crystal. Thus, the TN-type liquid crystal display panel is suitable for the display device of the field sequential system.

Figure 4:
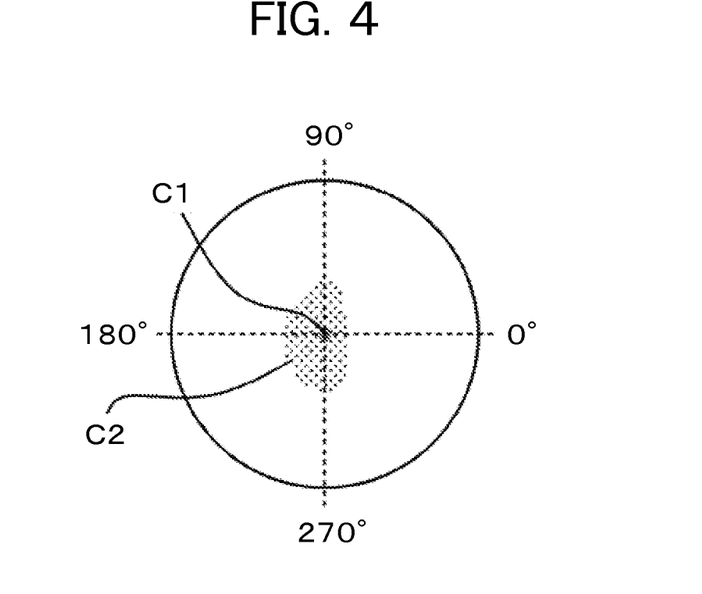
FIG. 4 is a view showing the azimuthal dependence of the viewing angle characteristics of the TN-type liquid crystal display panel.

However, there is a problem in the viewing angle characteristics for the TN-type liquid crystal display panel 10. In particular, the viewing angle varies depending on the azimuth direction of the screen. FIG. 4 is a view showing the azimuthal dependence of the viewing angle characteristics of the liquid crystal display panel 10. In FIG. 4, C1 is the area in which the contrast is the highest and C2 is the area in which the contrast is the next highest.

In the case of FIG. 4, the contrast is high in the direction at an azimuth angle of the screen from 90 to 270 degree. In other words, the screen has a good viewing angle with this azimuth angle. Then, the viewing angle characteristics in the direction of 180 degree follow. However, when the azimuth angle is 0 degree, the uniformity of the viewing angle characteristics is poor. In this case, if the viewing angle is changed, the contrast may be reduced and color variation may occur. In other words, the uniformity of the viewing angle of the TN-type liquid crystal display panel is poor.

The TN liquid crystal display panel has a nature that the viewing angle characteristics are better in the direction at 45 degrees with respect to the rubbing direction of the alignment film. Thus, the rubbing direction of the TFT substrate and the counter substrate can be adjusted in order to improve the viewing angle at an angle that requires better viewing angle characteristics.

Figure 5:
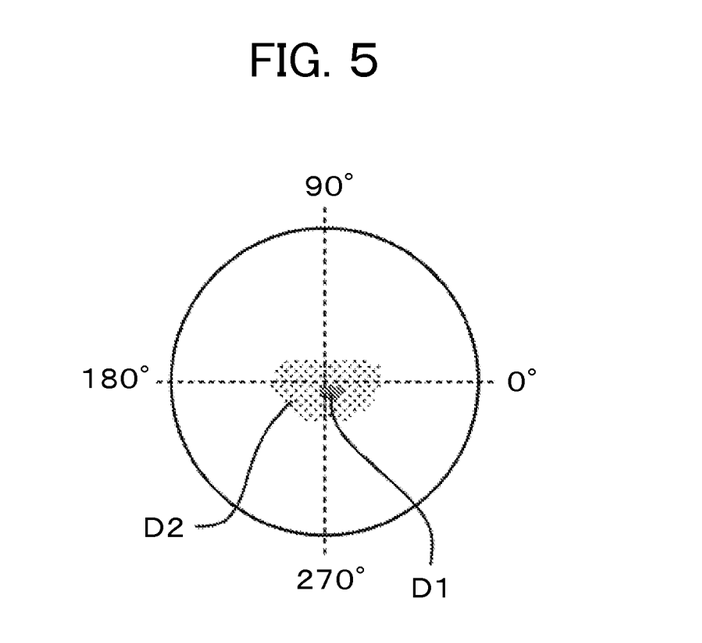
FIG. 5 is a view of the azimuthal dependence of the emission intensity when parallel light is incident on the back surface of an anisotropic diffusion film.

However, it may also be required that the viewing angle characteristics be uniform over all azimuthal directions in the screen. The present invention achieves this requirement by providing the anisotropic diffusion film 20 on the front side of the liquid crystal display panel 10. FIG. 5 shows the viewing angle characteristics of the anisotropic diffusion film 20 that correspond to the characteristics of the liquid crystal display panel 10 shown in FIG. 4.

FIG. 5 is a view showing the amount of light emitted from the surface of the anisotropic diffusion film 20 at each azimuth angle when parallel light is incident on the back surface of the anisotropic diffusion film 20. In FIG. 5, D1 is the area in which the light is the most strongly emitted and D2 is the area in which the light is the second most strongly emitted.

In FIG. 5, the anisotropic diffusion film 20 has the area in which the light is strongly emitted at an angle from 0 to 180 degree. On the other hand, the amount of emitted light is small at an angle from 90 to 270 degree. This is the opposite relationship to the azimuthal characteristics of the contrast of the liquid crystal display panel shown in FIG. 4.

Figure 6:
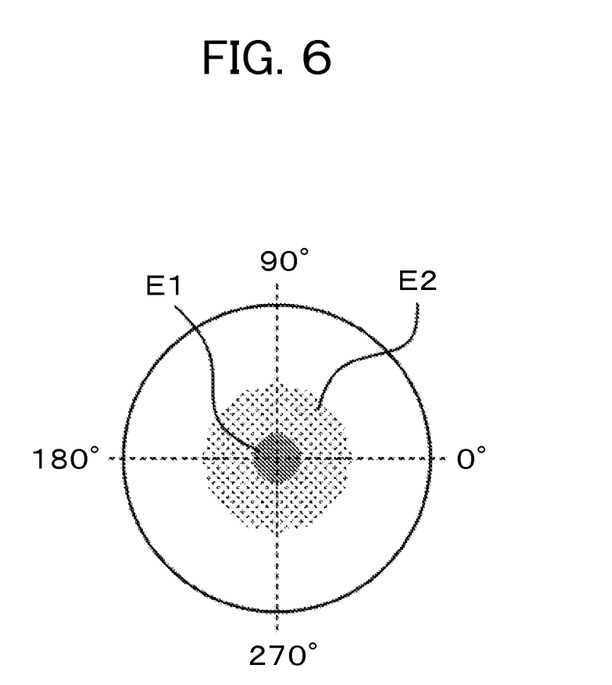
FIG. 6 is a view of the azimuthal dependence of the viewing angle characteristics when the anisotropic diffusion film shown in FIG. 5 is provided on the surface of the liquid crystal display panel shown in FIG. 4.

Thus, it is possible to uniform the viewing angle characteristics as the liquid crystal display device, over all azimuthal directions, by providing the anisotropic diffusion film 20 shown in FIG. 5 on the front side of the liquid crystal display panel 10 with the characteristics shown in FIG. 4. FIG. 6 is a view showing the viewing angle characteristics when the anisotropic diffusion film 20 shown in FIG. 5 is provided on the front side of the liquid crystal display panel 10 shown in FIG. 4.

In FIG. 6, E1 is the area in which the contrast is the highest and E2 is the area in which the contrast is the second highest. As shown in FIG. 6, the area of the high contrast is uniform over all azimuthal directions in the screen. In this way, the uniformity of the area of the high contrast can be achieved by using the anisotropic diffusion film with the characteristics of compensating the viewing angle characteristics of the liquid crystal display panel.

Thus, by using the structure of the present invention, it is possible to achieve the response speed of the liquid crystal as well as the uniformity of the viewing angle characteristics, which are required for field sequential operation. The present invention is characterized in that an anisotropic diffusion film is provided on the front surface side of the liquid crystal panel.

Figure 7:
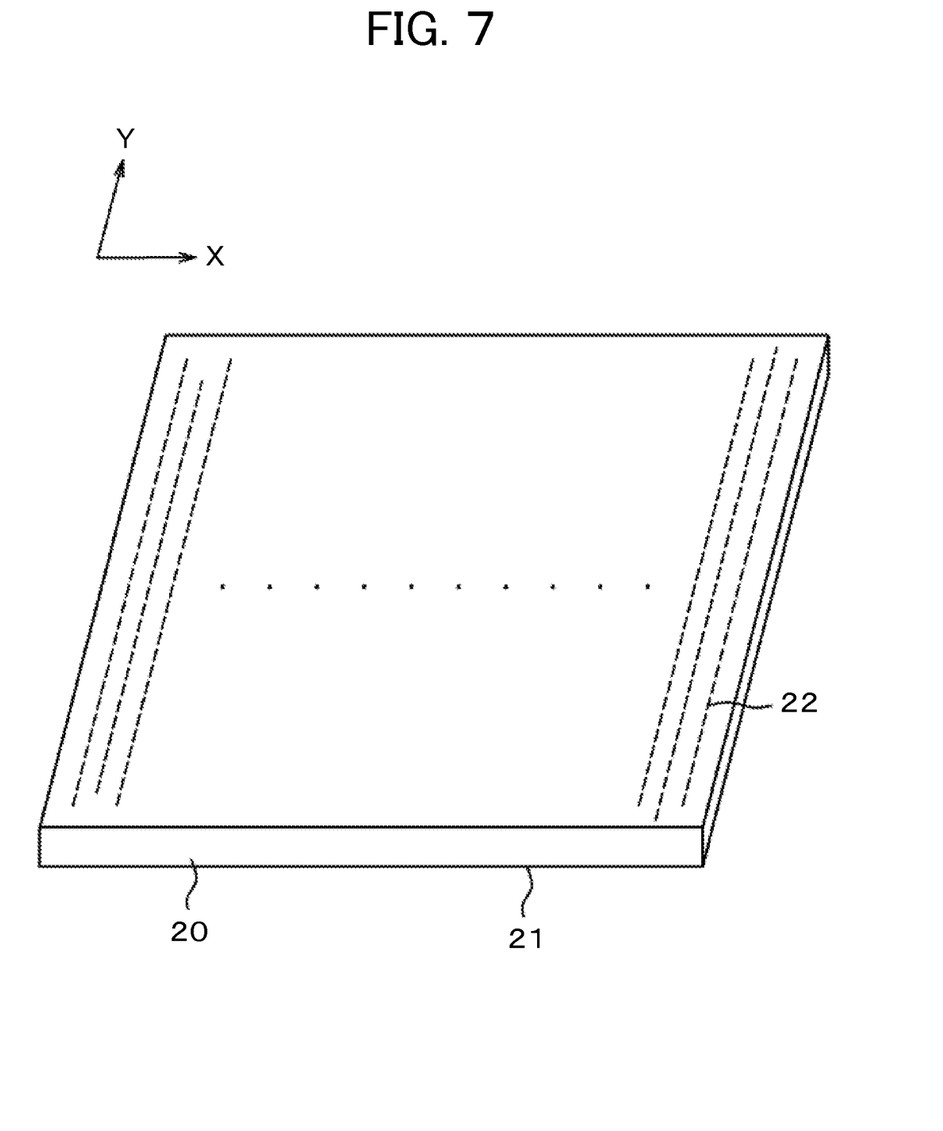
FIG. 7 is a first example of the anisotropic diffusion film.
Figure 8:
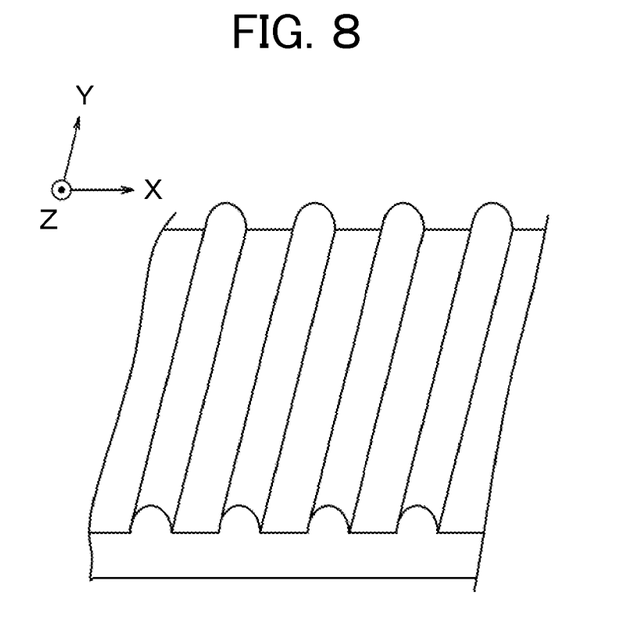
FIG. 8 is a second example of the anisotropic diffusion film.
Figure 9:
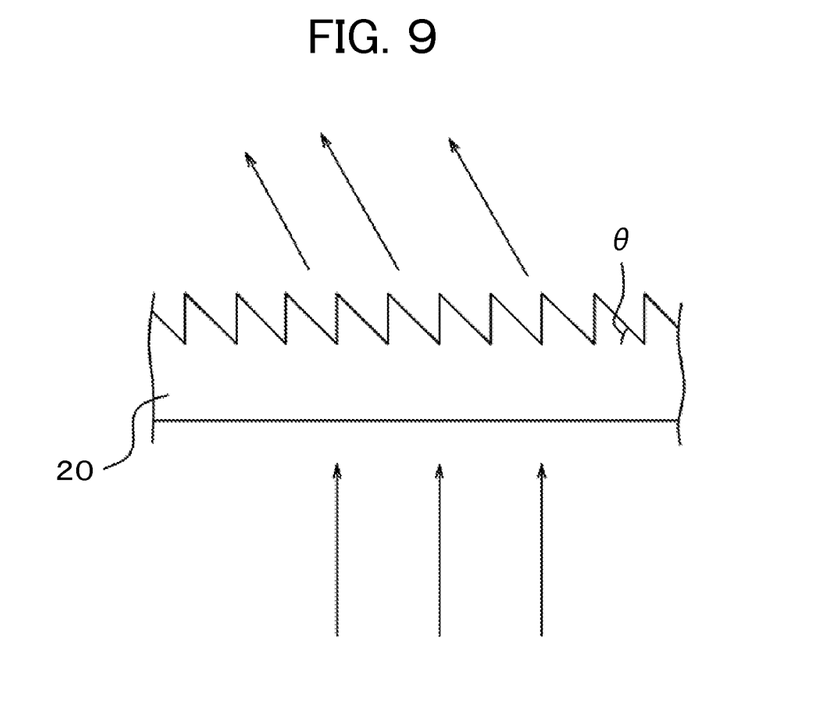
FIG. 9 is a third example of the anisotropic diffusion film.

FIGS. 7 to 9 are examples of the anisotropic diffusion film 20. The anisotropic diffusion film 20 shown in FIG. 7 has a structure in which glass fibers 22 are dispersed on a resin 21, such as acrylic or polycarbonate, so that the long axis is in the y direction. In this case, the light incident from the back surface of the anisotropic diffusion film 20 is more scattered in the x-axis direction. In other words, with respect to the light emitted from the anisotropic diffusion film 20, the intensity of the light in the x-axis direction is stronger than the intensity of the light in the y-axis direction.

This approximately matches the characteristics of the anisotropic diffusion film 20 shown in FIG. 5. Thus, it is possible to achieve a display device with excellent uniformity of the viewing angle by providing the anisotropic diffusion film 20 shown in FIG. 7 on the surface of the liquid crystal display panel 10 with the viewing angle characteristics shown in FIG. 4.

FIG. 8 is another example of the anisotropic diffusion film 20. In FIG. 8, a large number of lenticular micro lenses are formed on the surface of the sheet. FIG. 8 is a view of the anisotropic diffusion film, showing the action of focusing the light to be spread in the x direction into the z-axis direction. The anisotropic diffusion film of FIG. 8 has the same action as the action of the prism sheet in the backlight. However, the diffusion characteristics can be controlled by changing the pitch and size of the lenticular lens.

The characteristics of the anisotropic diffusion film 20 of FIG. 8 are different from the characteristics of the anisotropic diffusion film 20 shown in FIG. 5. However, it is possible to obtain the characteristics similar to those of the anisotropic diffusion film 20 of FIG. 5 by placing the anisotropic diffusion film 20 of FIG. 8 sideways on the surface of the liquid crystal display panel 10.

The anisotropic diffusion films 20 shown in FIGS. 7 and 8 have the characteristics of diffusing and focusing the light in the x-axis direction or in the y-axis direction. The anisotropic diffusion film shown in FIG. 9 is an example of deflecting the light in the positive or negative azimuth direction. In other words, as shown in FIG. 4, the contrast of the liquid crystal display panel 10 may vary in the 0-degree direction and in the 180-degree direction. In such a case, it is necessary to use the anisotropic diffusion film 20 of the example shown in FIG. 9.

In FIG. 9, the parallel light incident from the back surface of the anisotropic diffusion film 20 is strongly emitted in the direction indicated by arrows, by means of the anisotropic diffusion film 20. Assuming that this direction is the direction of 0 degree shown in FIG. 4, it is possible to obtain an extremely uniform viewing angle as the whole display device.

FIG. 9 is a cross-sectional view of the anisotropic diffusion film 20, in which the surface has a saw-tooth like prism shape. By selecting the pitch and height of the saw-tooth like prisms, it is possible to control the diffusion or focus direction, the diffusion or focus strength, and the like, in the anisotropic diffusion film.

The foregoing has described the case where the liquid crystal display panel 10 is of the TN type. However, the present invention can also be applied to the vertical alignment (VA) type liquid crystal display panel in which the response speed is relatively fast but the viewing angle characteristics are not sufficient. In addition, it is also possible to further improve the visual characteristics of the in-plane-switching (IPS) type liquid crystal display panel.

What is claimed is:

1. A liquid crystal display device comprising a backlight provided on a back side of a liquid crystal display panel which is formed in such a way that a liquid crystal layer is interposed between a first substrate and a second substrate, a first polarizing plate is attached to the outside of the first substrate, and a second polarizing plate is attached to the outside of the second substrate, wherein the liquid crystal display panel and the backlight are driven by a field sequential system, wherein an anisotropic diffusion film is attached onto the first polarizing plate which is located on the display surface side of the liquid crystal display panel, wherein the distribution of the contrast of the liquid crystal display panel varies depending on the azimuth direction, wherein the emission intensity when parallel light is incident on the anisotropic diffusion film varies depending on the azimuth direction, and wherein the azimuth direction in which the contrast of the liquid crystal display panel is small is equal to the azimuth direction in which the emission intensify when the parallel light is incident on the anisotropic diffusion film is strong.

2. The liquid crystal display panel according to claim 1, wherein the liquid crystal display panel is a TN-type liquid crystal display panel.

3. The liquid crystal display panel according to claim 2, wherein the azimuth direction in which the emission intensity of the anisotropic diffusion film is strong varies in the positive azimuth direction and in the negative azimuth direction.

* * * * *